United States Patent [19]

Hess et al.

[11] Patent Number: 4,581,701
[45] Date of Patent: Apr. 8, 1986

[54] MONITORING PLURAL PROCESS CONTROL STATIONS

[75] Inventors: Wilfried Hess, Langen; Erwin Buxmeyer, Dreieich; Wolfgang Ziegler, Bad Soden-Salmünster/Mernes; Gerd R. Tremmel; Arthur Barthol, both of Frankfurt, all of Fed. Rep. of Germany

[73] Assignee: Hartmann & Braun AG, Frankfurt, Fed. Rep. of Germany

[21] Appl. No.: 486,256

[22] Filed: Apr. 18, 1983

[30] Foreign Application Priority Data

Apr. 23, 1982 [DE] Fed. Rep. of Germany ....... 3215177

[51] Int. Cl.$^4$ .......................... G05B 9/02; G06F 11/00; H04J 1/16; H04J 11/00
[52] U.S. Cl. ........................ 364/187; 371/8; 371/9; 371/14; 371/21
[58] Field of Search ................... 364/186, 187; 371/8, 371/9, 10, 11, 14, 15, 21, 25

[56] References Cited

U.S. PATENT DOCUMENTS

| | | | |
|---|---|---|---|
| 3,566,355 | 2/1971 | Smith | 364/187 X |
| 4,123,794 | 10/1978 | Matsumoto | 364/187 X |
| 4,141,066 | 2/1979 | Keiles | 364/187 X |
| 4,191,966 | 3/1980 | Chesley | 364/200 |
| 4,377,000 | 3/1983 | Staab | 364/187 X |
| 4,378,588 | 3/1983 | Katzman et al. | 364/200 |
| 4,399,372 | 8/1983 | Tanimoto et al. | 371/8 X |
| 4,463,450 | 7/1984 | Haeusele | 371/10 X |

FOREIGN PATENT DOCUMENTS

| | | | |
|---|---|---|---|
| 54-19628 | 2/1979 | Japan | 371/9 |
| 54-32542 | 9/1979 | Japan | 371/9 |
| 55-64693 | 5/1980 | Japan | 371/10 |

OTHER PUBLICATIONS

J. W. Pence, Deleting Data Sets; *IBM Technical Disclosure Bulletin*, vol. 24, No. 7B Dec. 1981, pp. 3670–3671.

Primary Examiner—Joseph Ruggiero
Assistant Examiner—Jon D. Grossman
Attorney, Agent, or Firm—Ralf H. Siegemund

[57] ABSTRACT

A monitoring system for several process control stations includes a redundancy station having a central processing unit and an operating memory to take over the functions of a dropped out process control station. The takeover involves internal bus separation to separate auxiliary and long term storage facilities from immediate processing facilities in each of the process control stations so that upon separation of the latter from the former the redundancy station can effectively take over together with the peripheral equipment and auxiliary devices. The redundancy station cyclically monitors the operating state of the several process control stations and particularly tests status information contained in the particular buffer portion of each of the processing stations. Moreover, relevant data is copied into a standby buffer during each cyclic monitoring step to be used if, pursuant to the next reoccurring supervising and monitoring step, the particular process control station is found to be defective.

8 Claims, 1 Drawing Figure

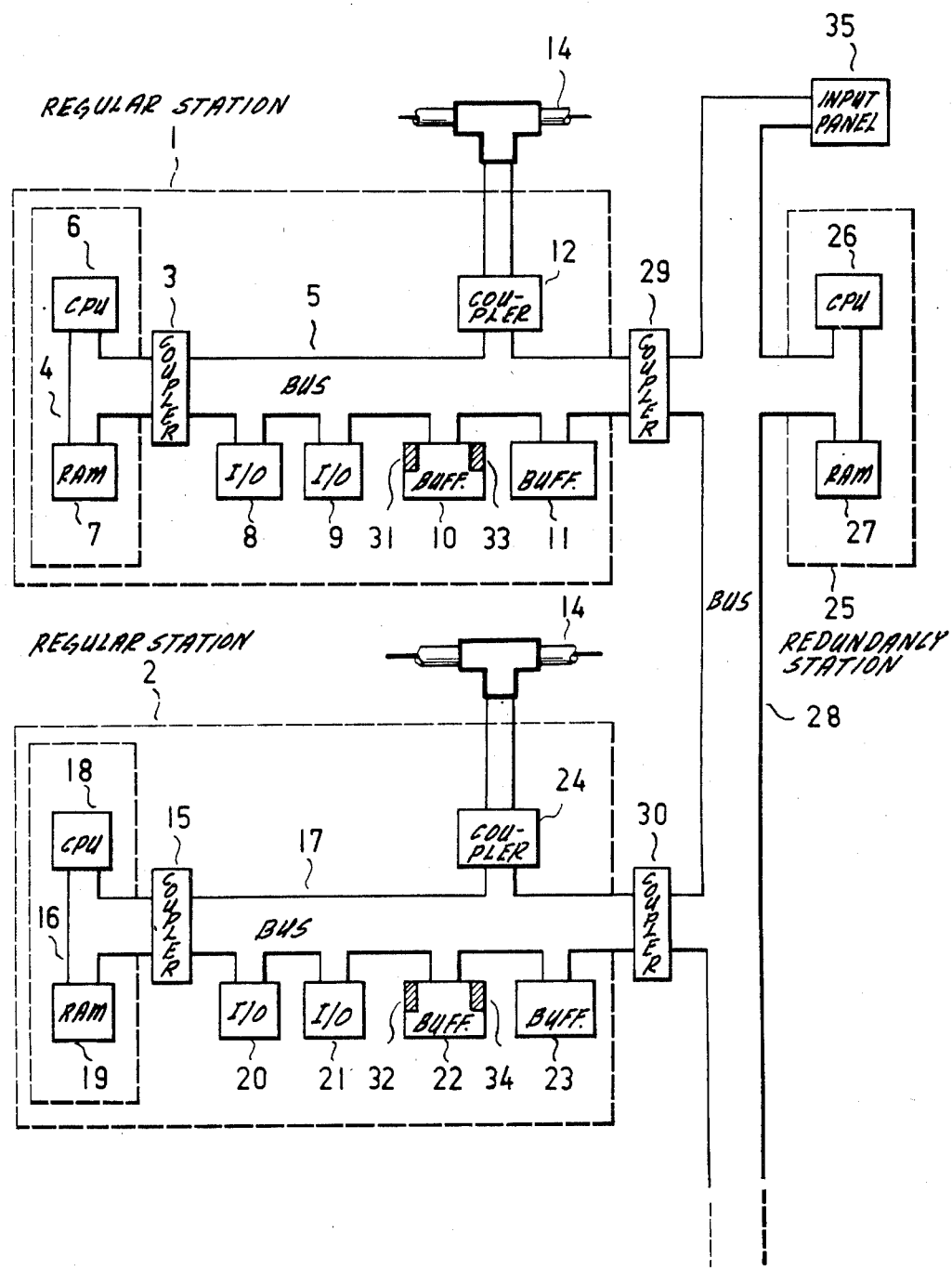

MONITORING PLURAL PROCESS CONTROL STATIONS

BACKGROUND OF THE INVENTION

The present invention relates to monitoring one or several similarly constructed process control stations and including a redundancy station.

The publication 01/70/10 DE 659/10.80 Ca of applicant's assignee and called "Contronic P Digital-" page 39, left column, describes a monitoring system for altogether four similarly constructed process control stations under inclusion of an additional redundancy or standby station which in case of dropout of one of the process stations takes over its function. The redundancy station includes at least one central processing unit with associated operating memory. These particular components are quite similar to those in each of the four regularly operating process control stations. A system bus interconnects the station bus of the redundancy station with the station bus of the individual process station under utilization of a so-called redundancy coupler. Aside from the similarities already mentioned, the redundancy station includes the same configuration data as well as firmware components as the four associated process stations. However, details of this particular monitoring system are not derivable from the publication above.

DESCRIPTION OF THE INVENTION

It is an object of the present invention to provide a monitoring system for a process control system in which in the case of occurence of an error an uninterrupted control and process control operation can be provided for, to continue with certainty even in the case of an error, using in particular status information concerning the operating state of whatever is being operated by such process control station.

In accordance with the preferred embodiment of the present invention, a monitoring system for a process control system with error recognition and compensation in the monitoring function is suggested which includes a plurality of process control stations coupled, for example, to a large scale chemical or other process facility and controlling selected portions thereof whereby each of the process stations includes two bus sections separated by a redundancy coupler; one of these station bus sections is connected to a central processing unit and operating memory providing, so to speak, the heart of the process control and operation; the other internal station bus section is connected to peripheral facilities and two buffers, one of which is continuously updated and the other one receives copied information from the first buffer for holding the same until another copy cycle occurs from the first to the second buffer. More particularly, the first buffer contains a currently valid, continuously updated representation of the process portion as controlled by the respective station, the second buffer contains also such representation but having been acquired at an earlier time and having been copied from the first buffer to the second buffer to be held therein for backup purposes. Moreover, the first buffer includes status information on the operational state of the particular station. In addition, a redundancy station is provided with a central processing unit and a fairly large operating memory and being coupled to all of the first mentioned process monitoring stations through the second bus section in each instance and through redundancy interface couplers. The redundancy station takes over the central processing and operating memory functions for any process station found to be defective pursuant to a cyclically running and continuing supervising and monitoring operation. The takeover is effected by deactivating respective internal redundancy couplers which separate the first and second internal bus section. The state of defectiveness was determined by the contents of the first buffer while now the contents of the second buffer are used by the redundancy station for continuing the monitoring and process control operations. In furtherance of the invention, the monitoring function provided by the redundancy station may cyclically effect the copying of the content of the first buffer into the second buffer whereby certain dedicated portions of the first buffer contain critical data as well as the result of auto-diagnostic tests. The takeover by the redundancy station may be determined on the basis of the content of that latter buffer cell content. Conversely, pursuant to each monitoring function as provided cyclically by the redundancy station, each of the process control stations may briefly test the operative state of the redundancy station to prevent any ingress on part of the redundancy station if it is found to be defective. One may provide manual intervention to effect a takeover by the redundancy station on demand. Also, the normal data transfer between different process control stations via a separate bus may be carried out under utilization of the first buffer in each instance while in the case of control of a particular process station by the redundancy station, the second buffer is used for that purpose.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a block diagram of an example of the preferred embodiment of the present invention for practising the best mode thereof.

Proceeding now to the detailed description of the drawings, the FIGURE illustrates a process control system which may have any number of process control stations for example four process stations, but only two are illustrated in order to avoid needless repetition. The two process control stations are identified by reference numerals 1 and 2. Process station 1 includes a station bus for internal bit parallel operation which is divided into two sections 4 and 5 by means of a redundancy coupler 3. The first section of the station bus, namely section 4, is associated with a central processing unit 6 as well as its operating memory 7. The second section of the station bus, 5, is associated with peripheral equipment devices 8 and 9 as well as with two buffer systems 10 and 11. Moreover, a bus coupler 12 is associated with the section 5 of the station bus. The bus coupler or interface 12 connects the process station 1 with a serial by bit data bus 14. This data bus 14 is the principal bus to which all of the various process control stations are interconnected and through which data are exchanged among these stations whenever the operation so requires.

The process control station 2 is constructed similarly to the station 1. Therefore, the particular station includes two bus sections 16 and 17, a central processing unit 18 with operating memory 19; two pieces of peripheral equipment 20 and 21, two buffers 22 and 23, as well as a coupler unit 24 for coupling the bus section 17 to the external bus 14. Also a redundancy coupler 15 is provided to separate the two cross sections 16 and 17.

The system is further provided with a redundancy station 25 which includes a central processing unit 26 and an operating memory 27. These components are similar to the components respectively 6 and 7 of station 1 or 18 and 19 in station 2 from an overall point of view, but particularly the memory 27 may be larger. Reference numeral 28 refers to the station bus of the redundancy station 25 and is coupled by means of a redundancy or interface coupler 29 to station bus section 5 of station 1. Analogously, a redundancy interface coupler 30 connects the station bus 28 to the section 17 of the station bus in station 2. As indicated schematically, the station bus 28 may extend to other process stations to which it will be coupled in analogous fashion.

The memory 27 of redundancy station 25 includes the same configuration data and firmware components as the memories 7 and 19 of stations 1 and 2 respectively. Also configuration data and firmware components of any other process station connected to the system are also included in the memory 27. In other words, memory 27 of the redundancy station 25 contains the configuration data of all process station connected to the station bus 28.

Turning now to certain particulars, the buffer 10 stores an "image", possibly in symbolic configuration, as an instantaneous representation of the process controlled by station 1. Analogously, buffer 22 stores such a symbolic image of the instantaneous configuration and operating state of the process controlled by station 2. Representations of other process portions controlled by other stations are analogously stored.

Buffer 10 of station 1 includes a particular location block or cell 31 which is cyclically updated as to its content during normal operation and particularly by operation of the central processing unit 6. The content of that cell is thus a simple indicator that station 1 does perform the control functions. Analogously, the buffer 22 of process station 2 includes a cell or memory block portion 32 whose content is cyclically modified or updated, during normal operation and by operation of the central processing unit 18 of station 2. Other process stations include analogously these functions specific types of data cells indicating operation per se of the respective station and the content of the respective cell is cyclically changed by the respectively central processing unit in these other stations.

In addition to the cyclic modification and change of the content, for example, on the data cell 31 by means of operation of the central processing unit 6 in process station 1, the process station monitors itself. In other words, the program in the station's memory facilities includes a diagnostic and test program. Within the frame of this diagnostic monitoring and self testing process of and by the station itself, errors are detected and symbolic representation such as status information being indicative of such recognized errors are stored in particularly dedicated memory portions 33 of the buffer 10. The automatic or self-monitoring of process station 2 is carried on analogously and errors recognized by that station are stored as corresponding status information in a dedicated data cell 34 of the buffer 22. Automatic or self-supervision in monitoring of one or the other station is carried out analogously, and error information is stored in like fashion.

It can thus be seen that the term "process control station" has a double meaning. On one hand, a particular chemical or other process is monitored by that particular station through suitable interfacing with chemical or other processing equipment. On the other hand, each such monitoring station has an autodiagnostic capability in that it monitors its own function. An error in the function of the process station is recognized pursuant to such diagnostic and self-monitoring operations and in such an instance digital processing function and data handling through the respective CPU-Memory subcombination is taken over by the redundancy unit 25. In the following, it is assumed for the sake of convenience that the redundancy station 25 is associated with altogether four process stations, which includes the two process stations 1 and 2 and two additional ones which function and operate in analogous fashion so that separate illustration is not necessary. It is moreover assumed that the redundancy standby and monitoring station 25 monitors cyclically these four processing stations.

It is now assumed, by way of example, that the redundancy station 25 has terminated the monitoring of process station 1 and has shifted to monitoring station 2. Pursuant to this operation, redundancy station 25 copies the content of data cells 32 and 34 into its memory 27 and compares the content copied from cell 32 with the content of the same data cells which was acquired by the redundancy station during the preceding monitoring cycle involving processing station 2. If there is a change in content exceeding a particular limit while, on the other hand, data cell 34 does not contain any status information which would correspond to a recognized error pursuant to the self-monitoring, then the redundancy station 25 copies the content of buffer 22 into the second buffer or station 2, namely, buffer 23. This transfer of information will remain in buffer 23 at least until redundancy station 25 has again arrived at station 2 in the next monitoring cycle. Also, the presently copied content of cell 32 is relocated in 27 to be used for an analogous comparison during the next monitoring cycle. This completes at this point the monitoring of process station 2 by the redundancy station 25. Redundancy station 25 will thereafter shift to the next process station for the same purpose. The minimum limit of a change in content of the data cells such as 32 or 31 leading to the described response is preferably selected to be uniform throughout the system so that even in case of a maximum extension of the system one can obtain a reasonable monitoring criteria.

Prior to permitting station 25 to access a station 1, 2, etc. . . , the redundancy couplers 29 and 30 of the process stations 1 and 2 cause a monitoring by the respective station of the redundancy station 25 and prevents access by the redundancy station 25 to the respective components of the process station undertaking this reciprocal monitoring when an error or defect or fault has been recognized to have occurred in the redundancy station 25. In other words, station 25 includes also a diagnostic program, and must transmit station information to a coupler or interface 29 or 30, which will block station 25 from interfacing if an error in station 25 has occurred and was recognized.

Continuing with the regular operation and assuming that the redundancy station 25 recognizes an error upon performing the aforedescribed monitoring function, for example, of process station 1, such error may, for example, be represented by an insufficient change in the content of the data cell 31 since the preceding monitoring cycle, or because data cell 33 includes status information which defines a particular error recognized during the self-monitoring period. It should be noted that in the case of "normal" errors both indications may be present, but in other error situations only one indication may be present, insufficient activity-cell 31 or positive error reception-cell 33. In either case, redundancy station 25 will take over the function of the process station deemed defective.

This takeover is carried out in that the redundancy and standby station 25 operationally separates the section 4 of the station bus from the second section 5, and the redundancy station 25 will now take over the function of the separated central processing unit 6 as well as of its associated memory 7.

As mentioned above, configuration data of the memories 7, 19 and others are all included in the memory 27 of the redundancy station 25. However, the possibility must be considered that the image of and symbolic representation of the process facilities contained in buffer 10 is already defective. For this reason, redundancy station 25 when having taken over will not use the contents of buffer 10, particularly as it concerns the representation of the operation by the station, but it will utilize instead of the copy or duplicated representation contained in buffer 11 which was loaded into buffer 11 during the preceding monitoring cycle when a defect had not yet occurred. Redundancy station 25 will thereafter work with the contents of buffer 11 as described.

It is pointed out, however, that even after the redundancy station 25 has taken over the functions of the memory and processing facility of a processing station, the monitoring of the other process stations is continued. This means that in case another one of the process stations drops out in a manner described, the redundancy station will be able to takeover all functions of the most important of all incorrectly working process stations. There is a ranking included in that process stations of lesser importance are switched by the redundancy station to manual operation.

In a particular configuration of a preferred embodiment of the present invention, an operating panel, console keyboard or the like 35 is connected to the station bus 28 of the redundancy station 25. This operating console permits redundancy switching, for example, for reasons of servicing a processing unit and/or its associated memory in that this particular package is taken out of the circuit and the monitoring operation is taken over temporarily by the redundancy station 25, not for reasons of a detected error but because of operator command through console 35.

Redundancy switching specifically includes a separation of the one particular service bus section such as 4 or 16 from the respective companion station bus section such as 5 or 17 and the takeover of the function of the now separated central unit 6 or 18 by means of the central unit 26 of the redundancy station 25 whereby the redundancy station 25 uses data buffered and stored in unit 11 or 23 as the case may be.

The data transfer in serial configuration across the bus 14 and between the various process stations such as 1 and 2 is carried out through the bus coupler 12 or 24 under utilization of one of the buffers such as 10 or 11 or 22 or 23. In the following and with particular reference to process station 1 we shall describe the selection of the buffer for the intended purpose. Normally, bus coupler 12 provides format conversion between serial and parallel bit combinations using the buffer 10 or 11 as source or destination for the respective data whereby the transfer between the coupler and the buffer is in parallel and the transfer of data from one station to another is a serial one. If the redundancy station 25 takes over the processing functions of one of the stations, the coupler will operate with the buffer 11 only or 23 respectively, if station 2 drops out. Switching from one buffer to another occurs upon the takeover of the station by the redundancy station 25, which switching occurs automatically by means of a control signal which signifies the change in operating state and condition as described. Thus, as the operation is taken over by the redundancy station, it is not necessary for externally modifying any addresses as far as information is concerned which is transmitted along the serially operating data bus 14.

The invention is not limited to the embodiments described above but all changes and modifications thereof not constituting departures from the spirit and scope of the invention are intended to be included.

We claim:

1. A monitoring system for process controllers with error recognition and compensation in a monitoring function comprising:
   a plurality of self monitoring process control stations, each including (i) a first and a second internal bus section interconnected by a redundancy coupler (ii) a central processing unit and an operating memory connected to the first section, (iii) a first and a second buffer and additional peripheral facilities connected to the second section, the first buffer containing a currently valid continuously updated representation of the process portion as controlled by the respective station the representation being produced pursuant to self monitoring, the second buffer containing a similar kind of representation of the process portion as controlled by the respective station and having resulted from self monitoring at an earlier point in time;
   a redundancy station including a central processing unit and a memory;
   coupler means for connecting the redundancy station to all said second bus sections; and
   the redundancy station assuming control of the operation of a process control station found to be defective by deactivating the respective redundancy coupler under utilization of the contents of the second buffer for continuing the process control function of the defective process station.

2. A monitoring system as in claim 1, said redundancy station operating for cyclically monitoring the operational state of the process stations of the plurality by being sequentially coupled to the process stations of the plurality through said coupler means, said redundancy station causing the content of the first buffer to be copied into the second buffer pursuant to the monitoring controlling function during each monitoring cycle.

3. Monitoring system as in claim 2, wherein the coupler means monitors the operating state of the redundancy station whenever the respective process station is coupled thereto pursuant to the monitoring cycle and in the case of detecting an error, the redundancy station is blocked from further accessing the particular process station.

4. A monitoring system as in claim 1, wherein said first buffer in each of the stations includes a particular memory location, the contents of which being continuously updated by the respective process station in a cyclic operation representing regular operation of the respective station, said redundancy station comparing the contents of the memory location with a previously acquired contents of said memory location and causing the taking over if the comparison does not meet specified criteria.

5. A monitoring system in accordance with claim 1 wherein each of said process control stations through its respective central processing unit and operating memory provides continuous diagnostic monitoring, said first buffer including a particular location receiving status information concerning the diagnostic monitoring, the status information being continuously updated pursuant to the the self-monitoring operation, said redundancy station inspecting said status information using it as a criteria for taking over.

6. Monitoring system in accordance with claim 1 and including externally accessible manually operated means for effecting a taking over of a particular process control station by the redundancy station.

7. Monitoring system in accordance with claim 1 and including an external data bus interconnecting the process control stations of the plurality for data exchange, the data exchange involving in each instance the content of the first buffer, a process control station having been taken over by the redundancy station using the second buffer for such inter-process control station communication.

8. Monitoring system as in claim 7 including means for selecting one of the buffers in the case of a takeover by the redundancy station.

* * * * *